US011938615B2

United States Patent
Feustel

(10) Patent No.: US 11,938,615 B2
(45) Date of Patent: Mar. 26, 2024

(54) PACKING GRIPPER SYSTEM

(71) Applicant: SCHMITT PROF. MÖHLMANN & COLLEGEN WIRTSCHAFTSKANZLEI INSOLVENZVERWALTER AKTIENGESELLSCHAFT, Zwickau (DE)

(72) Inventor: Martin Feustel, Lengenfeld (DE)

(73) Assignee: Schmitt Prof. Möhlmann & Collegen Wirtschaft, Zwickau (DE)

( * ) Notice: Subject to any disclaimer, the term of this patent is extended or adjusted under 35 U.S.C. 154(b) by 573 days.

(21) Appl. No.: 17/275,426

(22) PCT Filed: Sep. 12, 2019

(86) PCT No.: PCT/EP2019/074377
§ 371 (c)(1),
(2) Date: Mar. 11, 2021

(87) PCT Pub. No.: WO2020/053340
PCT Pub. Date: Mar. 19, 2020

(65) Prior Publication Data
US 2022/0048203 A1 Feb. 17, 2022

(30) Foreign Application Priority Data
Sep. 12, 2018 (DE) ...................... 10 2018 007 205.4

(51) Int. Cl.
B25J 15/02 (2006.01)
B65G 47/90 (2006.01)

(52) U.S. Cl.
CPC .......... B25J 15/0266 (2013.01); B65G 47/90 (2013.01); *B65G 2201/022* (2013.01)

(58) Field of Classification Search
CPC . B25J 15/0266; B65G 47/90; B65G 2201/022
See application file for complete search history.

(56) References Cited

FOREIGN PATENT DOCUMENTS

| DE | 68358 | | 7/1967 | |
|---|---|---|---|---|
| DE | 1756613 | A1 | 10/1970 | |
| DE | 3734302 | A1 | 4/1988 | |
| DE | 3802166 | A1 | 8/1989 | |
| DE | 4138186 | C1 * | 5/1993 | ............. B23Q 3/157 |
| DE | 3841041 | C2 * | 3/1998 | .......... B25J 15/0266 |
| DE | 19733495 | B4 | 2/1999 | |
| DE | 202008005837 | U1 | 7/2008 | |

(Continued)

OTHER PUBLICATIONS

PCT International Search Report dated Dec. 16, 2019 in connection with PCT/EP2019/074377.

*Primary Examiner* — Stephen A Vu
(74) *Attorney, Agent, or Firm* — Brooks Kushman P.C.

(57) ABSTRACT

A packing gripper system has a load carrying device of a carrying and handling station for gripping, clamping, and lifting vertically directed depositing of individual plate and individual sheet packages into suitably sized container openings of holding and storage containers. The load carrying device is equipped with an expedient and fail-safe motion drive, which enables the gripper fingers to perform horizontally directed gripping and clamping and vertically directed lifting and setting down operations.

4 Claims, 3 Drawing Sheets

(56) References Cited

FOREIGN PATENT DOCUMENTS

| DE | 102009042891 A1 | | 3/2011 | | |
|----|----|----|----|----|----|
| DE | 102012012819 A1 | | 6/2012 | | |
| DE | 202014100898 U1 | | 2/2014 | | |
| EP | 0716891 A1 | | 6/1996 | | |
| EP | 3034250 A1 | | 6/2016 | | |
| GB | 2448947 A | * | 11/2008 | .......... | B25J 11/0045 |
| NL | 8601306 A | * | 12/1987 | .......... | B25J 15/0266 |
| SU | 878722 | | 2/1980 | | |
| WO | WO-2010149254 A1 | * | 12/2010 | .......... | B25J 15/0266 |
| WO | WO2015132720 A1 | | 9/2015 | | |

* cited by examiner

PACKING GRIPPER SYSTEM

FIELD OF THE INVENTION

The invention is based on the packing gripper system, wherein a load carrying device is part of a carrying and handling station by means of which gripping, clamping, lifting as well as vertically directed depositing of individual plate and individual sheet packages into suitably sized and only slightly larger sized container openings of holding and storage containers can be carried out.

For this purpose, the load carrying device must be equipped with an expedient and fail-safe motion drive, which enables the gripper fingers to perform horizontally directed gripping and clamping and vertically directed lifting and setting down operations. In this case, the load carrying device is to be designed as an outside gripper provided with vertical clamping faces on the inner sides of its gripper fingers.

BACKGROUND OF THE INVENTION

The state of the art in such load carrying devices is characterized by motion drives of different types and designs as well as different clamping jaw and gripper finger arrangements. As examples of further, in particular load-dependently designed load carrying devices, some of the published outside gripper solutions are described in the invention disclosures indicated hereinafter.

Subject matter of
DE 10 2012 0 12 819 A1
is a gripping device for battery modules and publication DE 197 33 495 B4
relates to a carrying device for lifting and lowering loads, in particular electromechanical or electrical components, with their vertical movements requiring attachment of their center ring lugs to a crane hook or to a separate load suspension gear with hooks of a crane and the horizontal gripping element adjustment and movement of which require manual operator action. The crossbeam arrangements make a stepped or pivoting gripping element configuration necessary and necessitate large space requirements for these load carrying devices.

The load handling system for packaged piece goods as per description in
publication SU 878 722
has a space-saving design of its gripper fingers. The load suspension gear for attachment to a crane has an elaborate and multi-component structure and cannot be steplessly adjusted.

Subject matter in
publication DD 68 358
is a pair of tongs for lifting heavy loads, with the individual workpiece or workpiece package being gripped via a scissors-type lever system making use of swiveling grippers with a steplessly adjustable gripper spacing. This gripper system is provided with a hydraulic motion cylinder that moves the grippers in the vertical main stroke direction and so-called gas pressure cylinders for the horizontal as well as the pivoting movement of the grippers in their auxiliary stroke direction as autonomous and independent energy sources of the movement drive. Its structure is therefore complex and of multi-component design. The arrangement and movement of the gripping elements of this load carrying device occupy a great amount of space.

The drive element of an electrically self-sufficient load handling gear as described in
publication DE 20 2014 100 898 U1
is a spindle driven by an electric motor for the closing and opening movement of the gripping means designed as gripper tongs with pivoting gripper jaws. The electrical power source for this load carrying device are accumulators arranged on a separate crossbeam.

Disadvantages of these prior-art load carrying devices are summarized as follows:
- the large space that is needed for swivel jaw and multiple gripper finger arrangements,
- the non-adjustable lifting and clamping force and lack of safety controls, in particular when the load carrying devices are operated manually, as well as the fact that the clamping width of gripper fingers cannot be steplessly adjusted and readjusted with respect to each other.

The objective that must be accomplished is to design the load carrying devices in packing gripper systems in such a way that they
- have a simply structured, steplessly adjustable design, and are provided with an expedient drive system by means of which even large clamping and friction forces of the clamping jaws and gripper fingers can be exerted on the vertical clamping surfaces of individual plates and individual sheets or on plate and sheet stacks, and
- enable a small-scale swivel jaw and multiple gripper finger arrangement.

SUMMARY OF THE INVENTION

The problems described hereinbefore of prior-art systems relating to the design of load lifting means and load carrying devices as outside grippers for vertical clamping surfaces on plate and sheet packages consisting of individual plates and individual sheets and for comparable individual components and component packs that need to be lifted are solved by the characteristics stated against patent claim 1.

The load carrying device, herein referred to as packing gripper system, is designed for the vertically directed depositing of previously gripped, clamped and lifted packages or stacks of plates and sheets into holding and storage containers provided with suitably sized and only slightly larger sized container openings. The packing gripper system consists of a frame rack with a drive module being arranged on the upper side of this rack. The drive module is designed in the form of an electric cylinder and comprises a linear drive which is powered by an electric motor and moving in vertical direction back and forth between two end positions. This linear drive is motionally connected to a gripper finger load carrying device via the scissor joint lever assemblies which are symmetrically arranged below each other and attached to the front of the frame rack. The gripper finger load carrying device is attached to the underside of the frame rack. Said device is equipped with two horizontally directed gripper finger carriers which project over a holding and storage container and are movable in the horizontal direction. The gripper finger carriers each support at least three slat- or rod-shaped bend-resistant rigid gripper fingers, which are arranged on both sides, vertically oriented and attached to them, and by means of which a plate and sheet package or stack, resting flat against and between the gripper fingers, is clamped between them at the retaining and pressing force exerted by the drive module, held vertically and horizontally oriented and accurately lowered into position and secured in the holding and storage container.

Supplementary characteristics are specified in patent claims 2 to 4 and relate to the configuration and the structure of the scissor joint lever assembly, the adjustability, and the dimensional adjustment of the distance/clearance between gripper finger carriers and gripper fingers with respect to each other.

BRIEF DESCRIPTION OF THE DRAWINGS

The proposed invention is elucidated via an embodiment example in the figures and explained in more detail in the following description, with FIG. 1: showing a 3D partial view of a load carrying device of a packing gripper system.

DETAILED DESCRIPTION OF PREFERRED EMBODIMENTS

Figure 1:
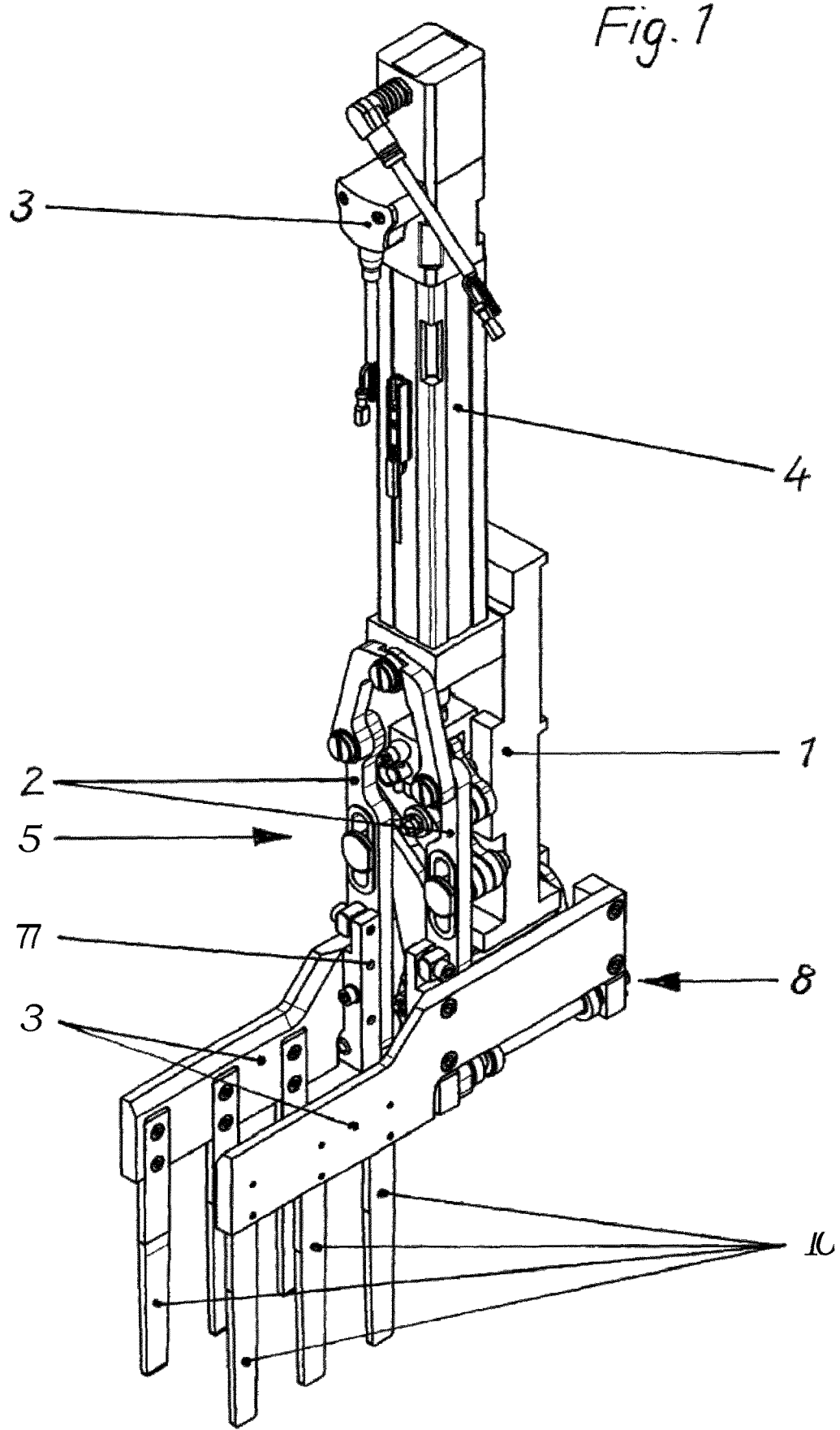

The load carrying device illustrated in FIG. 1, which forms part of a packing gripper system, essentially consists of a frame rack 1. Drive module 3 is attached to the upper side of the frame rack 1, said drive module being designed in the form of an electric cylinder and comprises a vertically movable linear drive 4 which is powered by an electric motor. The scissor joint lever assemblies 5 are mounted symmetrically below one another on the front side of the frame rack; by means of these assemblies the vertical movements of the linear drive 4 are transmitted as horizontally and vertically directed movements to the gripper fingers 10 of the gripper finger load carrying device 8 located on the underside of the frame. Via the parallel two retaining and guide rods 2, which are also arranged on the front side of the frame rack, the clamping width as well as the clamping position and opening width of the gripper fingers 10 in the raised and in the lowered packing position are set and adjusted by the scissor joint lever assemblies 5 in a way that varies the distance/clearance. The two gripper finger carriers 9, each for three arranged gripper fingers 10, are supported on the retaining and guide rods 2 by means of an upper and connecting part each 11.

Figure 2:
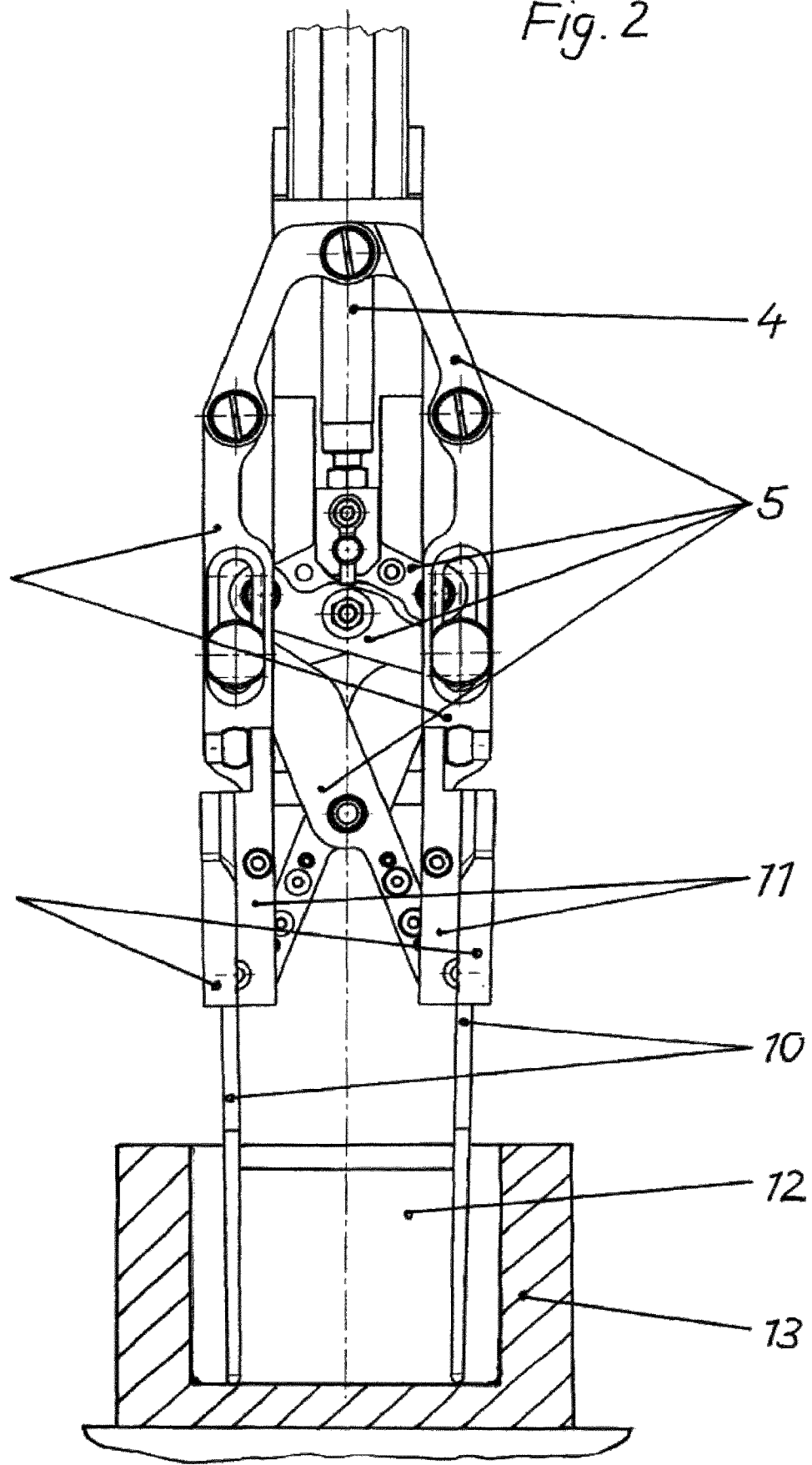
FIG. 2: depicting a front side view of the load carrying device according to FIG. 1 and FIG. 3: showing a front side view of the angle and scissor joint lever assemblies of the packing gripper system illustrated in FIG. 1.

In FIG. 2 the load carrying device of the packing gripper system is shown in lowered position. A plate and sheet package 12, clamped on both sides by the gripper fingers 10 arranged on gripper finger carriers 9, is lowered into the slightly larger container opening of the holding and storage container 13, set down and thus boxed up. After the vertical lowering movement of the retaining and guide rods 2 caused by the movement of the linear drive 4 and the pivoting movements of the scissor joint lever assemblies 5, the gripper fingers 10 located on the gripper finger carriers 9 are in a lower clamping position with the plate and sheet package 12.

Figure 3:
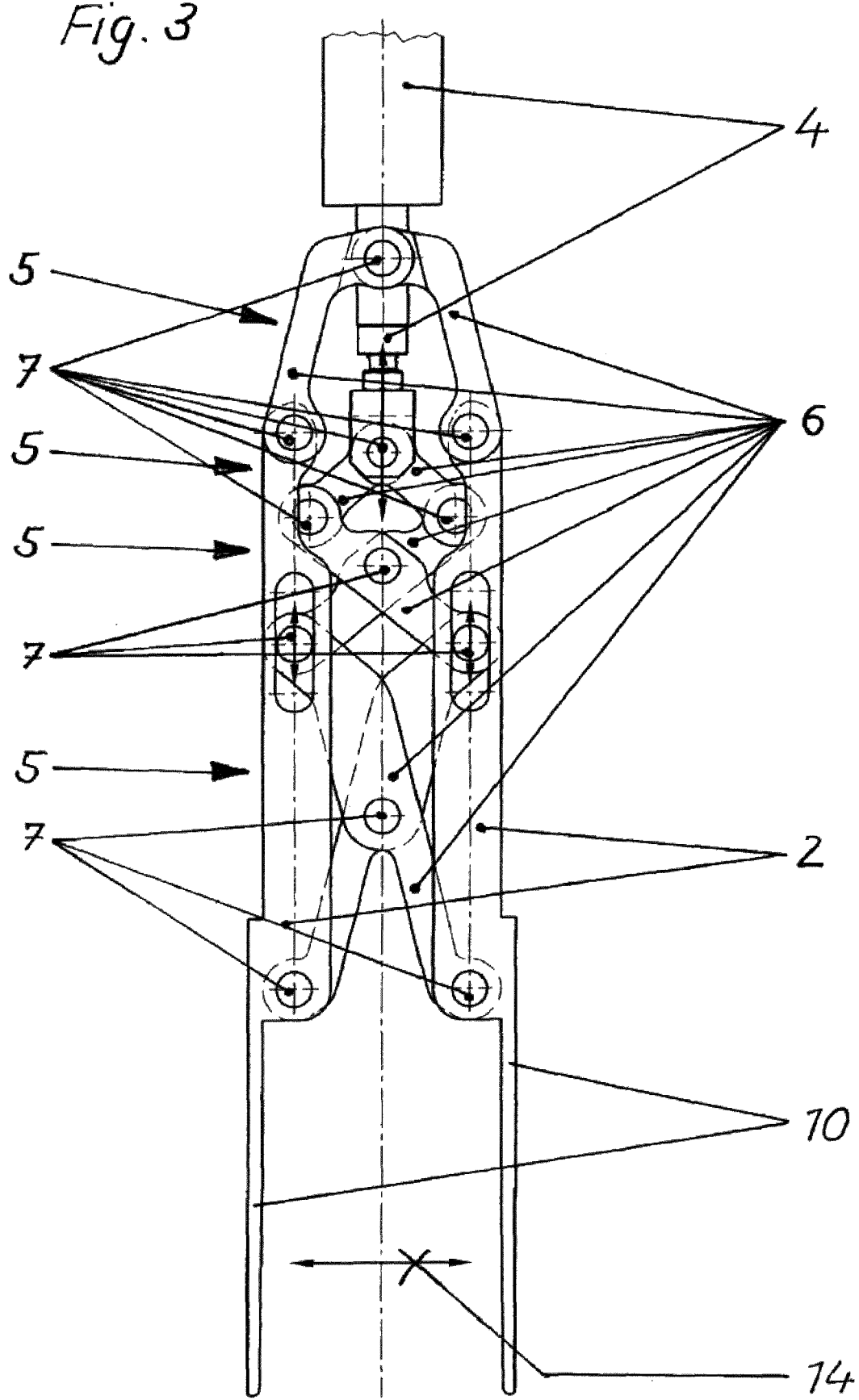

Additionally illustrated in FIG. 3 is the structure of the four scissor joint lever assemblies 5, by means of which, driven by the linear drive 4, the gripper fingers 10 are lowered in a vertically directed manner and adjusted so as to be spaced at a clamping width 14. Connected to the linear drive 4 by means of joint pin 7 two angularly opening and closing pivoting joints and two joints pivoting back and forth in a universal joint, each equipped with two scissor joint links 6 and each equipped with a joint pin 7 in symmetrical central position and a joint pin 7 on both sides in the slotted holes arranged in the two parallel retaining and guide rods 2 are arranged one below the other so as to be pivotally movable and guided longitudinally movable in a vertically directed manner and movably connected with the gripper fingers 10.

Not shown in the figures are further modules of the packing gripper system with a load carrying device as part of a complex carrying and handling station, by means of which the joining, boxing and transporting of, for example, machined battery modules comprising individual plates as packages/stacks in battery containers of suitably sized design can be accomplished.

LIST OF REFERENCE NUMERALS

1 Frame rack
2 Retaining and guide rods on 1
3 Drive module
4 Linear drive of 3
5 Scissor joint lever assembly
6 Scissor joint links of 5
7 Joint pins for 5
8 Gripper finger load carrying device
9 Gripper finger carrier on 8
10 Gripper fingers on 8
11 Upper and connecting parts between 9 and 2
12 Plate and sheet package
13 Holding and storage container for 12
14 (adjustable) clamping width between 10

The invention claimed is:

1. A packing gripper system comprising a carrying and handling station for gripping, clamping, and lifting as well as vertically directed depositing of individual plate and sheet packages (12), held on its outer surfaces by means of frictional forces, wherein vertically directed flatly contacting and pressed together bending-resistant individual plates and individual sheets, being designed as battery plates of a battery module, are placed in a box-shaped holding and storage container (13) arranged underneath, in the form of battery containers with suitably sized and only slightly larger container openings for the battery modules to be accommodated, and after opening and releasing in an opposite direction and subsequent lifting on and off of the plate and sheet package (12), the holding and storage container (13) is transported out of the carrying and handling station by means of conveyor systems, characterized in that said system comprises a frame rack (1) having an upper side attached to a drive module (3), said drive module being designed in the form of an electric cylinder and comprises a vertically directed movable finitely designed linear drive (4) powered by an electric motor, said linear drive positioned on a front side of the frame rack, being motionally connected via scissor joint lever assemblies (5) arranged symmetrically and below each other in a gripper finger load carrying device (8), and on an underside of the frame rack, the gripper finger load carrying device (8) is equipped with two horizontally directed movable gripper finger carriers (9) which are horizontally directed arranged projecting over a holding and storage container (13) and which are movable in a horizontal direction and which each carries at least three slat- or rod-shaped bend-resistant gripper fingers (10) which are arranged on both vertical sides, wherein the individual plate and sheet package (12) resting flat against and between the gripper fingers (10) is clamped between them at a retaining and pressing force exerted by the drive module (3), held movable vertically and horizontally oriented and accurately lowered into position and secured in the holding and storage container (13).

2. The packing gripper system according to claim 1, wherein one of the scissor joint lever assemblies (5) is mounted centrally and another one of the scissor joint lever assemblies (5) is below the other one on the frame rack (1); and the scissor joint lever assemblies (5) are designed in the form of two angular opening and closing joints arranged in a middle of the linear drive (4) on the drive module (3), wherein one joint located at a lower end of the linear drive (4), and one universal joint pivoting to and from arranged between two vertical retaining and guide rods (2), and are provided with scissor joint links (6).

3. The packing gripper system according to claim 1, characterized in that a distance between oppositely arranged the gripper fingers (10) is determined and adjustable by means of the gripper finger carriers (9) of the gripper finger load carrying device (8), by means of upper and connecting parts (11) with two retaining and guide rods (2) located in a parallel vertical arrangement with respect to one another on the frame rack (1), by means of spacing-variable joint pins (7) and adjusting screws arranged in slotted holes thereof and by means of the scissor joint links (6) pivotable around said joint pins (7).

4. The packing gripper system according to patent claim 1, characterized in that a dimension-changing adjustment of a spacing dimension of the gripper finger carriers (9) and gripper fingers (10) may be required for a plate and sheet package (12) of different sizes and can be brought about by means of a repositioning of the joint pins (7) and adjusting screws along the slotted holes provided in the retaining and guide rods (2).

\* \* \* \* \*